US010303356B2

(12) United States Patent
Park et al.

(10) Patent No.: US 10,303,356 B2
(45) Date of Patent: May 28, 2019

(54) MOBILE TERMINAL AND METHOD FOR CONTROLLING THE SAME

(71) Applicant: LG Electronics Inc., Seoul (KR)

(72) Inventors: Jinok Park, Seoul (KR); Seonggoo Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/166,874

(22) Filed: Oct. 22, 2018

(65) Prior Publication Data

US 2019/0056847 A1 Feb. 21, 2019

Related U.S. Application Data

(63) Continuation of application No. 14/966,402, filed on Dec. 11, 2015, now Pat. No. 10,108,332.

(30) Foreign Application Priority Data

Jan. 21, 2015 (KR) .................. 10-2015-0010182

(51) Int. Cl.
*G06F 3/0488* (2013.01)
*G06F 3/041* (2006.01)
*G06F 3/0486* (2013.01)
*G06F 3/0484* (2013.01)

(52) U.S. Cl.
CPC .......... *G06F 3/0488* (2013.01); *G06F 3/0412* (2013.01); *G06F 3/0416* (2013.01); *G06F 3/0486* (2013.01); *G06F 3/04842* (2013.01); *G06F 2203/04101* (2013.01); *G06F 2203/04104* (2013.01); *G06F 2203/04808* (2013.01)

(58) Field of Classification Search
CPC .. G06F 3/0488; G06F 3/04883; G06F 3/0484; G06F 3/04886; G06F 3/04845
See application file for complete search history.

(56) References Cited

U.S. PATENT DOCUMENTS

| 9,325,903 B2 | 4/2016 | Kim et al. |
| 2004/0150668 A1 | 8/2004 | Myers et al. |
| 2010/0275150 A1 | 10/2010 | Chiba et al. |

(Continued)

FOREIGN PATENT DOCUMENTS

EP 1852774 11/2007

OTHER PUBLICATIONS

European Search Report in European Application No. 16000017.0, dated Jul. 7, 2016, 4 pages.

*Primary Examiner* — Gerald Johnson
(74) *Attorney, Agent, or Firm* — Fish & Richardson P.C.

(57) ABSTRACT

Disclosed are a mobile terminal having a display unit for outputting screen information and capable of enhancing a user's convenience related to the screen information, and a method for controlling the same. The mobile terminal includes: a touch screen configured to display screen information, and a controller configured to select a region of the touch screen based on first and second touch inputs when the first and second touch inputs applied to different points of the touch screen are maintained for a reference amount of time without being released, and configured to execute a function related to the selected region when a touch input corresponding to a preset condition is applied to the touch screen while the first and second touch inputs are maintained without being released.

20 Claims, 18 Drawing Sheets

(56) References Cited

U.S. PATENT DOCUMENTS

| | | |
|---|---|---|
| 2010/0283750 A1 | 11/2010 | Kang et al. |
| 2010/0299641 A1 | 11/2010 | Cundill |
| 2012/0002065 A1 | 1/2012 | Park et al. |
| 2014/0109004 A1 | 4/2014 | Sadhvani et al. |
| 2014/0218611 A1 | 8/2014 | Park et al. |
| 2014/0237420 A1 | 8/2014 | Song et al. |
| 2014/0340337 A1 | 11/2014 | Han |
| 2015/0116218 A1* | 4/2015 | Yang .................. G06F 21/31 345/158 |
| 2016/0057356 A1 | 2/2016 | Nagano et al. |
| 2016/0336041 A1 | 11/2016 | Mukai et al. |
| 2017/0064206 A1* | 3/2017 | Ku .................. H04M 1/0264 |

\* cited by examiner

MOBILE TERMINAL AND METHOD FOR CONTROLLING THE SAME

CROSS-REFERENCE TO RELATED APPLICATION(S)

This application is a continuation of U.S. application Ser. No. 14/966,402, filed on Dec. 11, 2015, now allowed, which claims the benefit of earlier filing date and right of priority to Korean Application No. 10-2015-0010182, filed in Korea on Jan. 21, 2015, the contents of which are incorporated by reference herein in their entirety.

BACKGROUND

1. Field

The present invention relates to a mobile terminal, and more particularly, to a mobile terminal having a display unit for outputting screen information, and capable of enhancing a user's convenience related to the screen information, and a method for controlling the same.

2. Background

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

The mobile terminal has a screen capturing function and/or a screen recording function. The screen capturing function means a function to generate a digital image (or screenshot) including screen information displayed on a display unit, and the screen recording function means a function to generate a digital moving image (or screencast) obtained by recording screen information displayed on the display unit for a predetermined time.

In the conventional art, an entire region of screen information displayed on a touch screen may be captured or recorded. However, a user's desired region among the entire region of the screen information cannot be captured or recorded. For instance, for capturing of a partial region, a user should firstly capture the entire region of the screen information, and then should edit a captured digital image such that the digital image corresponding to the partial region is newly generated.

SUMMARY OF THE INVENTION

Therefore, an aspect of the detailed description is to provide a mobile terminal capable of executing a function related to a partial region among an entire region of a touch screen in a simple and rapid manner, and a method for controlling the same.

Another aspect of the detailed description is to provide a mobile terminal capable of selecting or setting a partial region among an entire region of a touch screen in a simple manner, and a method for controlling the same.

Another aspect of the detailed description is to provide a mobile terminal capable of executing a different function related to a partial region, according to a user's gesture applied to a touch screen after the partial region has been set, and a method for controlling the same.

Another aspect of the detailed description is to provide a mobile terminal capable of recording or capturing a partial region of a touch screen by using only a touch, and a method for controlling the same.

Another aspect of the detailed description is to provide a mobile terminal capable of executing a recording process or a capturing process with respect to part of a preview screen displayed on a touch screen, while a capturing function using a camera is executed separately from the capturing process, and a method for controlling the same.

To achieve these and other advantages and in accordance with the purpose of this specification, as embodied and broadly described herein, there is provided a mobile terminal including: a touch screen configured to display screen information; and a controller configured to set a partial region among an entire region of the touch screen based on first and second touch inputs, if the first and second touch inputs applied to different points of the touch screen are maintained for a reference time without being released, and configured to execute a function related to the set partial region, if a touch input corresponding to a preset condition is applied to the touch screen while the first and second touch inputs are maintained without being released.

In an embodiment, the mobile terminal may further include a memory configured to store therein a plurality of preset conditions corresponding to different functions related to the partial region. The controller may execute a different function related to the partial region, based on a touch input applied to the touch screen in correspondence to a condition among the plurality of preset conditions, in a state where the first and second touch inputs are maintained without being released.

In an embodiment, the controller may execute a function to select part among an entire text displayed on the entire region of the touch screen, if a touch input corresponding to a first condition among the plurality of preset conditions is applied onto the touch screen, in a state where the first and second touch inputs are maintained without being released. The controller may generate a digital image by capturing screen information included in the partial region, if a touch input corresponding to a second condition among the plurality of preset conditions is applied onto the touch screen in a state where the first and second touch inputs are maintained without being released.

In an embodiment, the controller may generate a digital moving image by recording screen information included in the partial region, in response to the touch input corresponding to the preset condition.

In an embodiment, when a recording process with respect to the screen information included in the partial region is started, the controller may display guide information indicating that the recording is being executed, on one region of the touch screen.

In an embodiment, upon reception of a drag input applied from a first point to a second point on the partial region during the recording process, the controller may display, on the partial region, an image which is gradually changed along a path of the drag input.

In an embodiment, the image may be recorded together with the screen information displayed on the partial region.

In an embodiment, the image may disappear from the touch screen when the drag input is released.

In an embodiment, when the touch input corresponding to the preset condition is applied to the touch screen during the recording process, the controller may terminate the recording process.

If an application is driven during the recording process, an execution screen of the application may be displayed on the touch screen, and screen information displayed on the set partial region among an entire region of the execution screen may be recorded.

In an embodiment, the controller may generate a digital image by capturing screen information included in the set partial region image, in response to the touch input corresponding to the preset condition.

In an embodiment, upon generation of the digital image, the controller may output servers to which the digital image is to be transmitted in the form of links. When at least one of the servers is selected, the controller may output a message writing window including the digital image.

In an embodiment, the function related to the set partial region may be a function to display a plurality of graphic objects corresponding to different functions related to the set partial region, on one region of the touch screen.

In an embodiment, if at least one of the first and second touch inputs is moved in a state where the first and second touch inputs are maintained without being released, the controller may reset the set partial region based on the at least one touch input.

In an embodiment, the controller may control the touch screen such that the partial region is distinguished from the remaining region among the entire region of the screen information.

In an embodiment, the controller may set first and second edges by using touch points of the first and second touch inputs, and may set the partial region by using the first and second edges.

In an embodiment, if a graphic object corresponding to a control function is displayed on at least one of touch points of the first and second touch inputs when the first and second touch inputs are received, the controller may restrict execution of the control function.

In an embodiment, when at least one of the first and second touch inputs is released, the controller may release the set partial region.

In an embodiment, the touch input corresponding to the preset condition may include third and fourth touch inputs consecutively applied onto a predetermined region of the touch screen within a reference time.

To achieve these and other advantages and in accordance with the purpose of this specification, as embodied and broadly described herein, there is also provided a method for controlling a mobile terminal, the method including: displaying screen information on a touch screen; setting a partial region among an entire region of the touch screen based on first and second touch inputs, if the first and second touch inputs applied to different points of the touch screen are maintained for a reference time without being released; and executing a function related to the set partial region, if a touch input corresponding to a preset condition is applied to the touch screen while the first and second touch inputs are maintained without being released.

The present invention can have the following advantages.

According to at least one of embodiments of the present invention, a user can execute various functions related to a partial region, such as capturing or recording the partial region, by setting the partial region on a touch screen using a thumb and a middle finger, and by consecutively applying an index finger (forefinger) onto the touch screen. Thus, a novel user interface can be provided, and a user's convenience can be enhanced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1A:
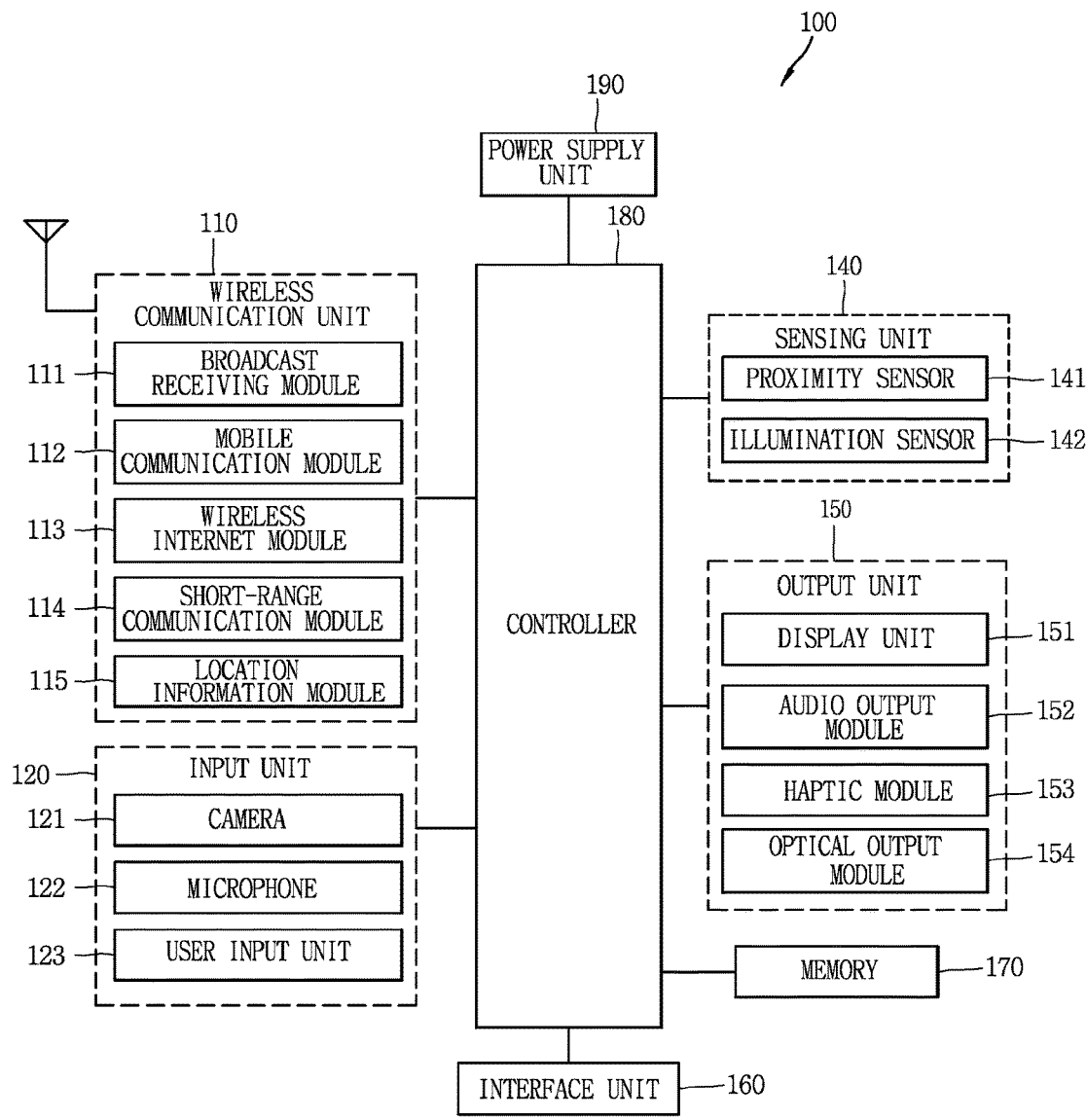
FIG. 1A is a block diagram of a mobile terminal according to the present invention.
Figure 1B:
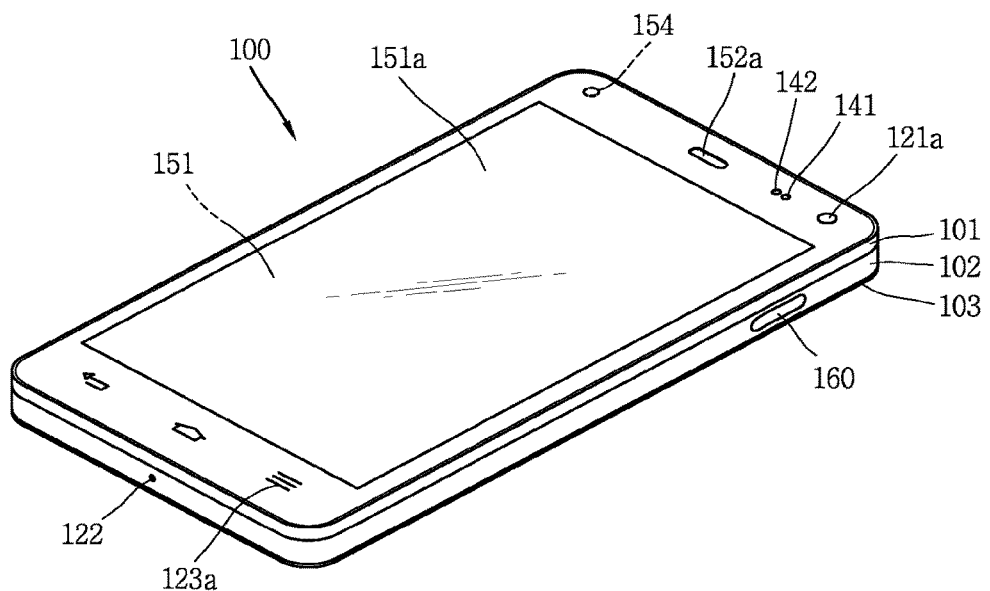
FIGS. 1B and 1C are conceptual views for explaining an example of a mobile terminal according to the present invention, which are viewed from different directions.
Figure 1C:
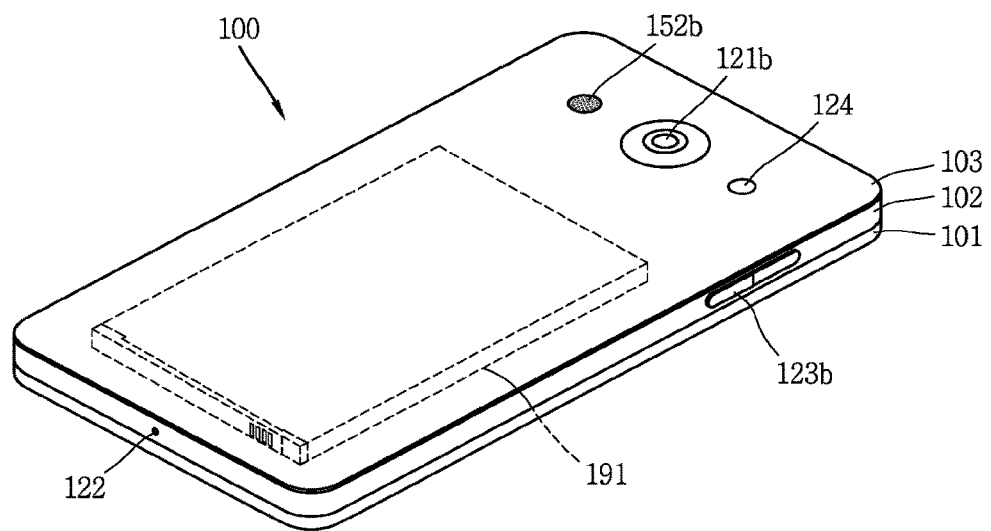

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touch inputs and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touch inputs. Such touch inputs includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The controller 180 may set a region among an entire region of screen information displayed on the touch screen 151, by a user's gesture, and may execute a function related to the set region. The user's gesture to set a region may be differentiated from a user's gesture to execute a function related to the set region, and the user's gestures may be input in a touch manner. The function related to the set region may be variable according to a type of an inputted user's gesture. Hereinafter, a mobile terminal capable of setting a region and executing various functions related to the set region, and a method for controlling the same will be explained in more detail with reference to the attached drawings.

Figure 2:
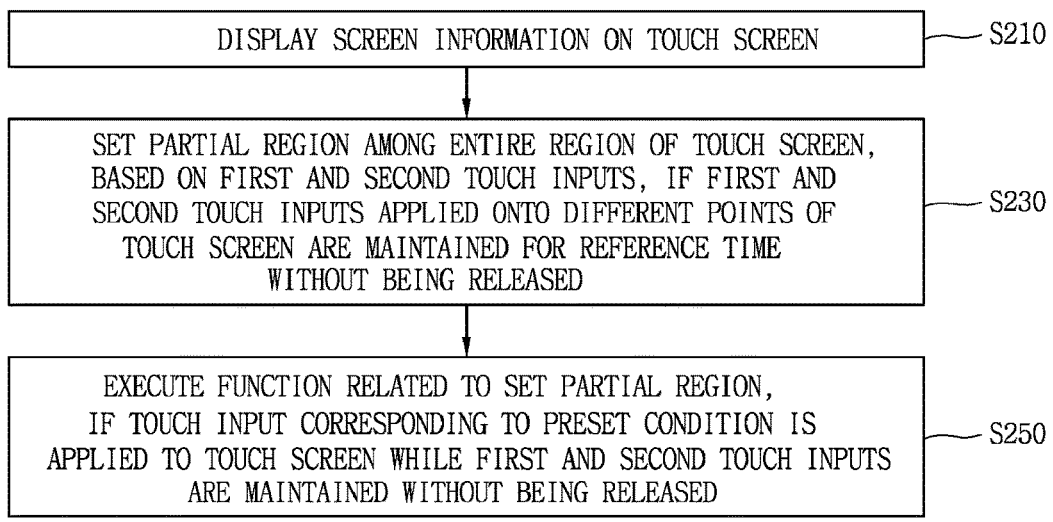
FIG. 2 is a flowchart illustrating a method for controlling a mobile terminal according to an embodiment of the present invention.
Figure 3:
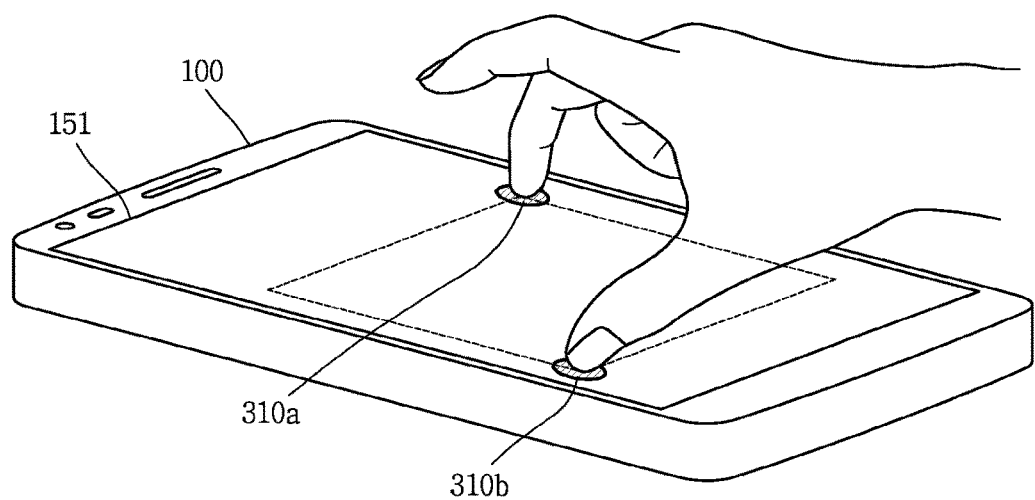
FIG. 3 is a conceptual view illustrating a user's gesture to set a partial region in a mobile terminal according to an embodiment of the present invention.

FIG. 2 is a flowchart illustrating a method for controlling a mobile terminal according to an embodiment of the present invention, and FIG. 3 is a conceptual view illustrating a user's gesture to set a partial region in a mobile terminal according to an embodiment of the present invention.

The controller 180 displays screen information on the touch screen (S210).

The screen information may be a home screen page. The home screen page may include at least one object, and the object may be an icon or a widget of an application installed on the mobile terminal.

As another example, the screen information may be an execution screen of an application. The application includes a widget, a home launcher, etc., which means all types of programs which can be driven in the mobile terminal. Thus, the application may be a program for executing a still or moving image capturing function, a video playing function, a message transmitting/receiving function, a schedule managing function, and an application update function.

Next, if a first touch input and a second touch input applied onto different points on the touch screen in a state where the screen information has been displayed on the touch screen are maintained for a predetermined time, the controller sets a region among an entire region of the touch screen, based on the first and second touch inputs (S230).

The touch input may mean a gesture contacting the touch screen. More specifically, the touch input may be understood as an operation to knock the touch screen by using an object such as a finger, or an operation to contact the object onto the touch screen.

The object used to apply a touch may be an object which can apply an external force to the touch screen. For instance, the object may be a finger, a stylus pen, a pen, a pointer, a fist, etc. Any object may be used if it can apply an external force to the touch screen.

If a plurality of touch inputs are applied onto different points on the touch screen in a state where the screen information has been displayed on the touch screen, the controller may determine that a user's gesture to set a region among an entire region of the touch screen has been sensed. For instance, a user's gesture to set a partial region among an entire region of the touch screen may include a first touch input and a second touch input applied onto different points on the touch screen in a state where the screen information has been displayed on the touch screen. For instance, when a first touch input is applied to a first point on the touch screen and a second touch input is applied to a second point on the touch screen, the controller may recognize the first and second touch inputs as a user's gesture to set a region.

For instance, as shown in FIG. 3, a first touch input 310a and a second touch input 301b may be received on different points of the touch screen. The first and second touch inputs may be received sequentially or simultaneously.

If the first and second touch inputs received on the different points of the touch screen are maintained for a predetermined time without being released, the controller sets a partial region among an entire region of the touch screen, based on the first and second touch inputs.

The controller counts a lapse time from a time point when the first and second touch inputs have been received, and compares the counted time with a preset time. For instance, if the second touch input is received in a state where the first touch input is maintained without being released, the controller counts a lapse time from a time point when the second touch input has been received. As another example, if the first and second touch inputs are simultaneously received, the controller counts a lapse time from a time point when the first and second touch input have been received.

The preset time may be a very short time, which may be within a range of 0.5~1.5 seconds. The preset time may be variously modified according to embodiments.

Once the preset time lapses, the controller sets a partial region based on touch points of the first and second touch inputs, among the entire region of the touch screen. More specifically, the controller may set a region including a touch point of the first input and a touch point of the second input, as a partial region. For instance, the controller may set first and second edges by using the touch points of the first and second touch inputs, and may set a partial region formed by lines which constitute the first edge, and lines which constitute the second edge. The partial region may have a quadrangular shape. As another example, the controller set a region consecutively connected from a starting point to an ending point, as a partial region. In this case, the starting point indicates the touch point of the first touch, and the ending point indicates the touch point of the second touch input.

The screen information displayed on the touch screen may include at least one graphic object corresponding to a control function. Generally, when a touch is applied onto a graphic object output in the form of a link or in the form of an icon or a widget, the controller should execute a control function corresponding to the graphic object to which the touch input has been applied. However, in the present invention, if first and second touch inputs are received on different points of the touch screen, the controller of the mobile terminal determines the touch inputs as a user's gesture to set a partial region, and restricts execution of a control function by at least one of the first and second touch inputs. That is, even if a graphic object is displayed on at least one of the first and second touch inputs, a control function corresponding to the graphic object is not executed.

Next, if a touch input corresponding to a preset condition is applied to the touch screen in a state where the first and second touch inputs are maintained without being released, the controller executes a function related to the set partial region (S250).

If at least one touch input is applied to the touch screen in a state where the first and second touch inputs are maintained without being released, the controller determines whether the touch input matches a touch input corresponding to a preset condition. If the touch input matches the touch input corresponding to the preset condition, the controller executes a function related to the preset condition.

The touch input corresponding to the preset condition includes a touch applied onto the touch screen at least once, in a state where the first and second touch inputs are maintained without being released. The preset condition may be related to at least one of the number of times, a position, a speed, an intensity and a pattern of the touch input.

For instance, the controller may execute a function related to the partial region when a touch is applied two times. That is, the touch input corresponding to the preset condition may mean at least two touch inputs consecutively applied onto the touch screen within a reference time.

Alternatively, the touch input corresponding to the preset condition may mean a plurality of touch inputs applied onto a predetermined region. That is, the touch input corresponding to the preset condition may include a third touch input and a fourth touch input consecutively applied onto a partial region of the touch screen within a reference time.

The reference time may be a very short time, which may be within a range of 300 ms~2 s. The partial region may be a partial region set by first and second touch inputs. Also, the partial region may mean the same region where a plurality of touch inputs have been applied, or a narrow region which can be regarded as the same point.

For instance, in case of applying a user's gesture using a right hand as shown in FIG. 3, first and second touch inputs using a thumb and a middle finger may be applied. If the contacted state of the thumb and the middle finger onto the touch screen is maintained for a reference time, a partial region is set based on contact points of the thumb and the middle finger. Then, if an index finger (forefinger) is consecutively applied onto the touch screen while the contacted state of the thumb and the middle finger onto the touch screen is maintained, the controller executes a function related to the set partial region.

The reason why a plurality of touch inputs are consecutively applied onto a partial region on the touch screen is in order to prevent execution of a function related to the set partial region, due to a user's undesired touch.

The touch input corresponding to the preset condition may be variously modified. The touch input corresponding to the preset condition may include various types of touch inputs such as a short touch, a long touch, a multi touch, a drag touch and a hovering touch.

If a touch input corresponding to a preset condition is applied onto the touch screen while the first and second touch inputs applied onto the touch screen are maintained, the controller may execute a function related to a partial region set by the first and second touch inputs.

The function related to the set partial region may mean all types of functions which are executable in the mobile terminal. In this case, the function related to the set partial region may mean a function executable with respect to the partial region set by the first and second touch inputs, not a function executable with respect to the entire region of the touch screen.

The function related to the set partial region may be a function to capture or record (videotape) screen information displayed on the partial region. Alternatively, the function related to the set partial region may be a function to select graphic objects or texts displayed on the partial region.

Still alternatively, the function related to the set partial region may be a function related to a driving of the mobile terminal. For instance, the function may be a function to turn on/off a light of the set partial region, or may be a function to control a brightness of the set partial region with maintaining a brightness of the remaining region.

A plurality of preset conditions corresponding to different functions related to the partial region may be stored in the memory of the mobile terminal. The controller may execute a different function related to the partial region, based on a touch input corresponding to a condition among the plurality of preset conditions, the touch input applied onto the touch screen in a state where the first and second touch inputs are maintained.

For instance, if a touch input corresponding to a first condition among the plurality of preset conditions is applied onto the touch screen in a state where the first and second touch inputs are maintained, the controller may execute a first function related to the partial region. On the contrary, if a touch input corresponding to a second condition among the plurality of preset conditions is applied onto the touch screen in a state where the first and second touch inputs are maintained, the controller may execute a second function related to the partial region.

The different functions related to the partial region may include a function to select at least one graphic object among graphic objects displayed on the entire region of the touch screen, a function to select part among an entire text displayed on the entire region of the touch screen, a function to generate a digital image by capturing screen information included in the partial region, a function to generate a digital moving image by recording screen information included in the partial region, etc.

A specific function related to the partial region, and a touch input for executing the specific function may be variously modified according to embodiments.

If a touch input not matching a preset condition is applied to the touch screen while the first and second touch inputs are maintained, the controller ignores the touch input not matching the preset condition. That is, the controller restricts execution of a function by the touch input not matching the preset condition. The controller may output information indicating the erroneous touch input, by using at least one of visual, tactile and audible methods. Accordingly, a user may recognize that he or she has applied the touch input erroneously.

With the aforementioned structure, a simple user interface may be implemented, because a partial region is set by a simple operation and a function related to the partial region is executable.

In the conventional art, a user should execute a plurality of steps in order to capture a partial region, or in order to select a text displayed on the partial region. This may cause a user's difficulty and a long time. The above embodiment is to solve such disadvantages.

The mobile terminal may execute a function related to the partial region in a novel manner using a plurality of touch inputs applied simultaneously.

Hereinafter, a configuration to set a partial region based on first and second touch input inputs will be explained in more detail.

FIGS. 4A to 4D are conceptual views illustrating embodiments to set a partial region by the user's gesture aforementioned in FIG. 3.

For convenience, a type and a characteristic of a touch input applied onto the touch screen are displayed in the form of a circle. A number inside the circle shape indicates a touch order, and a position of the circle indicates a touch position. A number inside a single circle means the number of times that a plurality of touch inputs have been sequentially applied to the same position within a reference time. A plurality of circles having the same number mean a plurality of touch inputs applied at the same time point.

The controller may sense a plurality of touch inputs applied onto different points of the touch screen, in a state where screen information has been displayed on the touch screen. If a reference time lapses while the plurality of touch inputs are maintained, the controller sets a partial region based on touch points of the plurality of touch inputs. For the setting of the partial region, at least two touch inputs should be maintained for a reference time without being released.

The plurality of touch inputs may not be necessarily input simultaneously. That is, even in a case where a plurality of touch inputs are input sequentially to thus be maintained without being released, a partial region may be set. For convenience, it is assumed that a plurality of inputs are input simultaneously. However, the mobile terminal and the method for controlling the same according to the present invention are not limited to that.

Figure 4A:
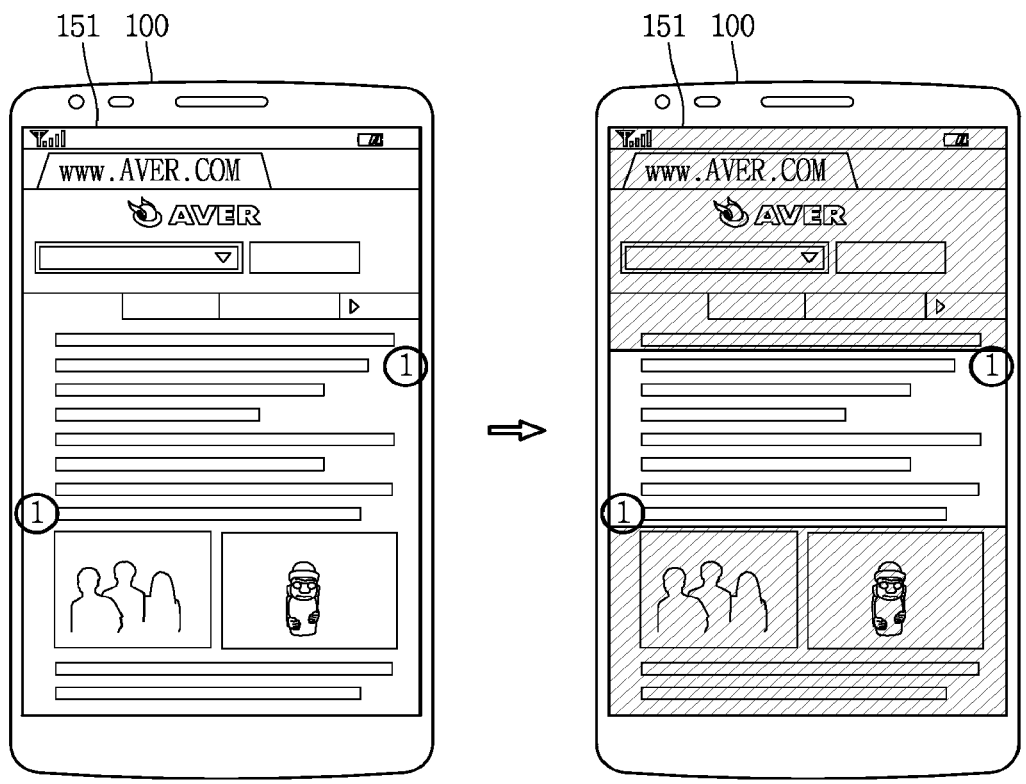
FIGS. 4A to 4D are conceptual views illustrating embodiments to set a partial region by the user's gesture aforementioned in FIG. 3.

More specifically, as shown in FIG. 4A, an execution screen of a web browser may be displayed on the touch screen 151 as screen information. In this state, a first touch input and a second touch input may be applied onto different points of the touch screen 151 (i.e., two circles having number '1').

Figure 4B:
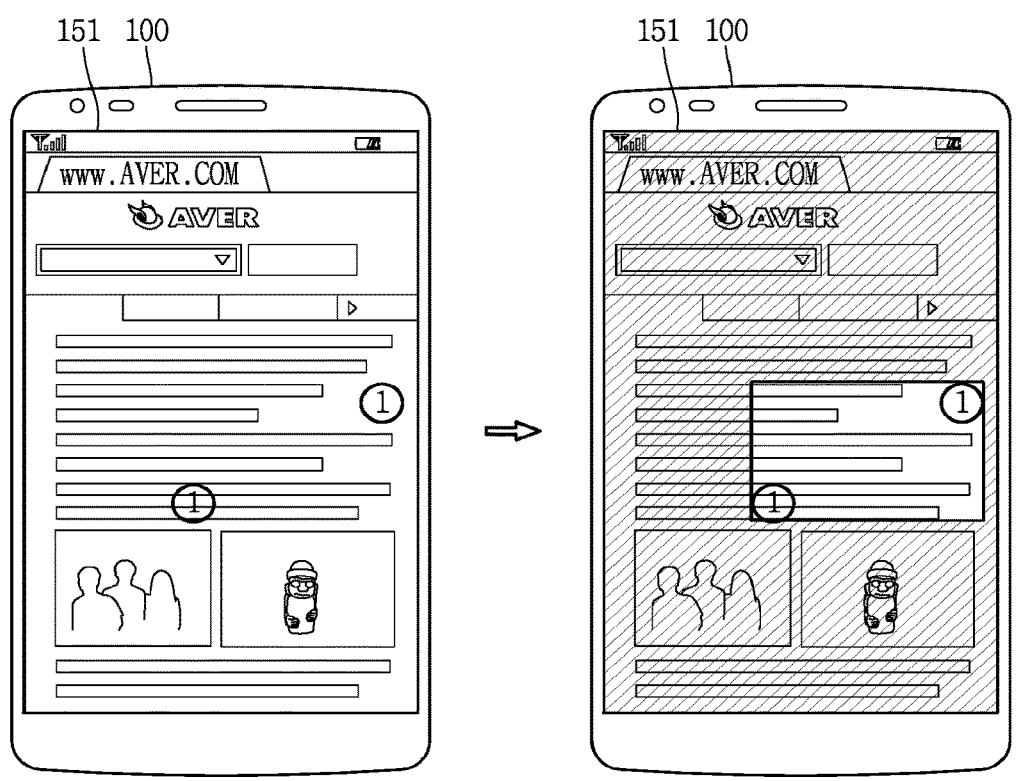

If a reference time lapses based on a time point when first and second touch inputs have been applied, the controller may set a partial region using touch points of the first and second touch input inputs. For instance, as shown in FIGS. 4A and 4B, the controller may set a first edge by using a touch point of the first touch input, and may set a second edge positioned in a diagonal direction of the first edge, by using a touch point of the second touch input. Also, the controller may set a partial region by using the first and second edges. That is, the partial region may be implemented as a quadrangular region formed by the first and second edges.

The partial region may be set in a first case where the first and second touch input inputs are maintained for a reference time, or in a second case where a touch input corresponding to a preset condition is applied while the first and second touch input inputs are maintained for a reference time. In the second case, if a reference time lapses from a time point when first and second touch inputs have been applied, the controller controls the mobile terminal to be in a ready state (activated state). Then, if a preset touch input is applied to the touch screen, the controller may set a partial region, and may execute a function related to the set partial region. Hereinafter, preferred embodiments of the present invention will be explained with taking the first case as an example. However, the present invention is not limited to this. That is, a partial region may be set in the second case.

Once the partial region is set, the controller may control the touch screen 151 such that the partial region is distinguished from the remaining region among the entire region of the screen information. That is, the partial region may be highlighted. For instance, the controller may generate a line (or an image) enclosing the edge of the partial region, or may differentiate the partial region from the remaining region in brightness. Alternatively, the controller may generate a visual effect such as a color change, an emphasis (bold) process, and a blinking process.

Figure 4C:
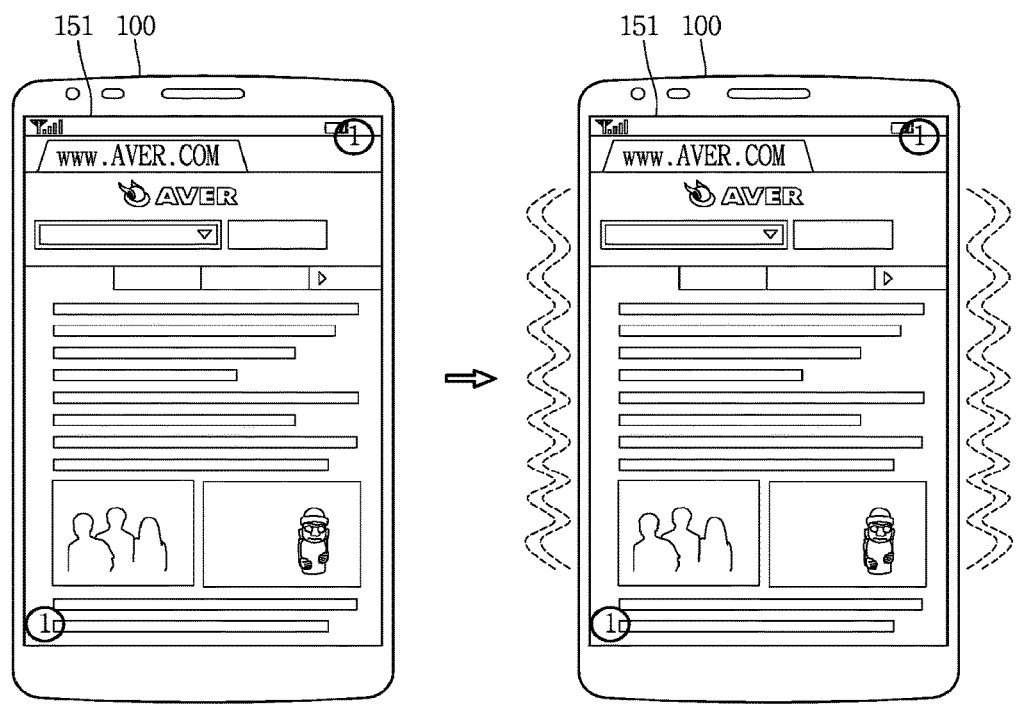

As shown in FIG. 4C, the entire region of the touch screen may be set by the first and second touch input inputs. More specifically, in a case where the first touch input is applied to a position adjacent to the first edge of the touch screen and the second touch input is applied to a position adjacent to the second edge of the touch screen, the controller may set (or select) the entire region of the touch screen if a reference time lapses from a time point when the first and second touch inputs have been applied.

The controller may output guide information indicating that the entire region of the touch screen has been selected, in one of visual, tactile and audible manners. For instance, as shown in FIG. 4C, once the entire region of the touch screen is selected, vibrations may occur. If a touch input corresponding to a preset condition is applied to the touch screen, while the first and second touch inputs are maintained without being released, in the state where the entire region of the touch screen has been selected, the controller executes a function related to the entire region. That is, in the present invention, as touch points of the first and second touch inputs become variable, a function related to the entire region or a partial region of the touch screen may be executed.

Figure 4D:
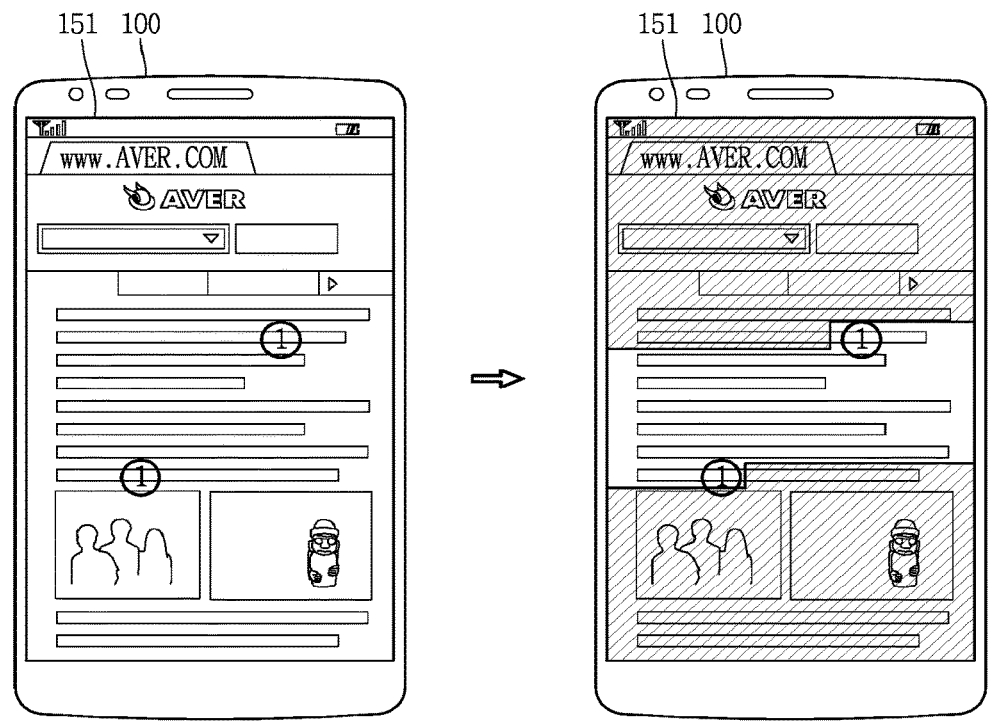

The partial region is not limited to have a quadrangular shape. For instance, as shown in FIG. 4D, the partial region may be set to have a polygonal shape. More specifically, the controller may set a touch point of the first touch input as a starting point, and may set a touch point of the second touch input as an ending point. Then, the controller may set a region consecutively connected from the starting point to the ending point, as a partial region. In this case, the partial region may have part of a left end and a right end thereof as an edge.

Although not shown, if at least one of the first and second touch inputs is released, in a state where the partial region has been set, the controller releases the set partial region. Thus, the highlight process of the partial region is terminated.

If at least one of the first and second touch inputs is moved, in a state where the partial region has been set by the first and second touch inputs, the controller may reset the set partial region.

Figure 5:
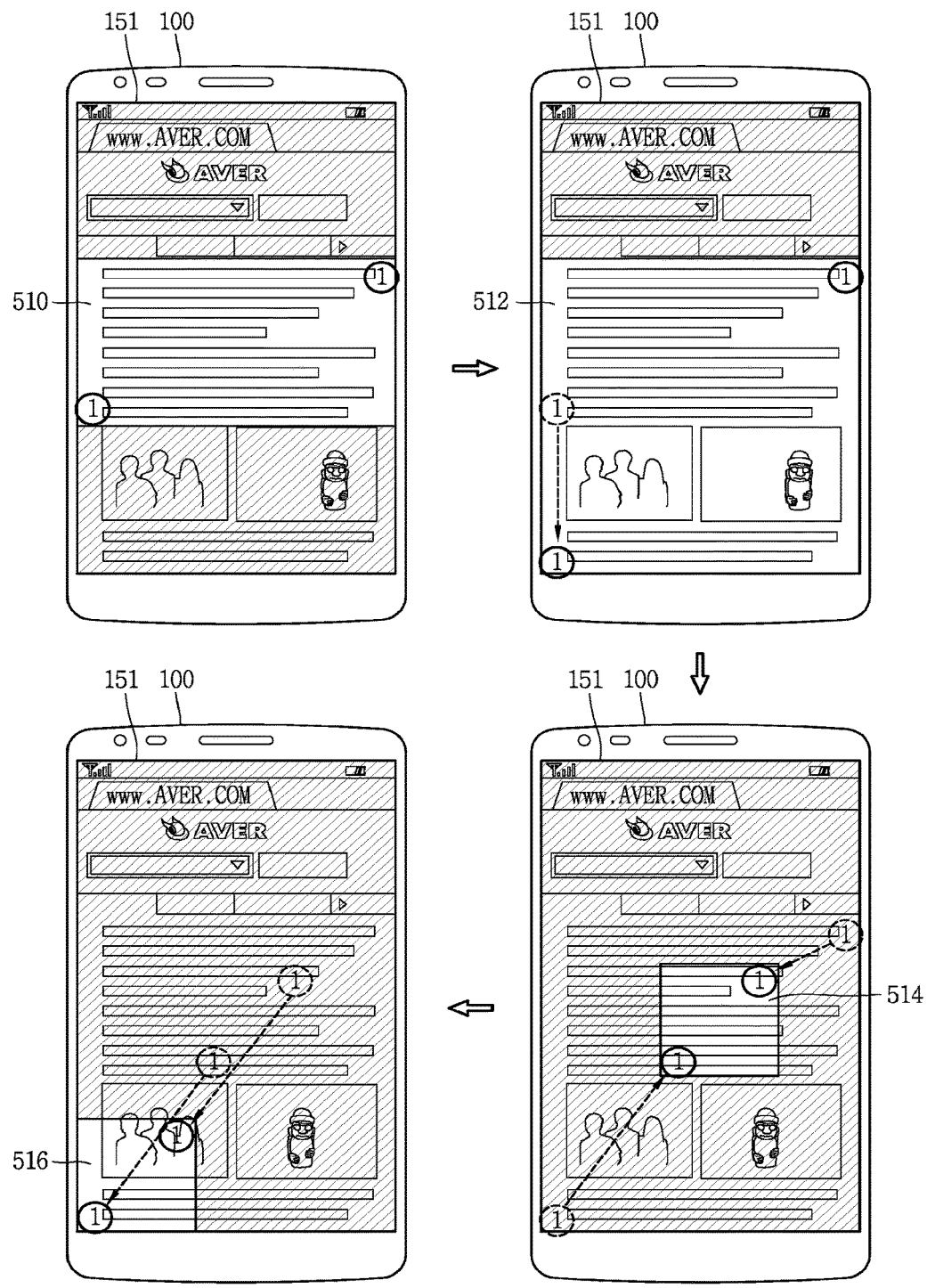
FIG. 5 is a conceptual view illustrating an embodiment to reset a predetermined set region.

FIG. 5 is a conceptual view illustrating an embodiment to reset a predetermined set region.

Referring to FIG. 5, a partial region 510 may be set to the touch screen 151 by first and second touch inputs. If a touch input corresponding to a preset condition is applied to the touch screen 151, while the first and second touch inputs are maintained without being released, the controller executes a function related to the partial region 510.

If at least one of the first and second touch inputs is moved, in a state where the first and second touch inputs are maintained without being released, the controller may reset the set partial region based on the movement of the at least one touch input. That is, a size and a position of the partial region may be changed by movement of at least one touch input. For instance, if one of the first and second touch inputs is moved, the partial region may be extended or contracted according to a point to which one of the first and second touch inputs has been moved (510→512). If both of the first and second touch inputs are moved, the partial region may be extended or contracted according to a point to which the first and second touch inputs have been moved (512→514). Alternatively, only a position of the partial region may be variable while a size of the partial region is maintained (514→516).

Once the partial region is set, execution of a control function by the first and second touch inputs is restricted, and thus a user's undesired function is not executed. Further, a user may simply select a partial region for executing a specific function, and may reset the selected partial region.

Hereinafter, embodiments to execute a function related to a partial region by a touch input corresponding to a preset condition will be explained.

Figure 6A:
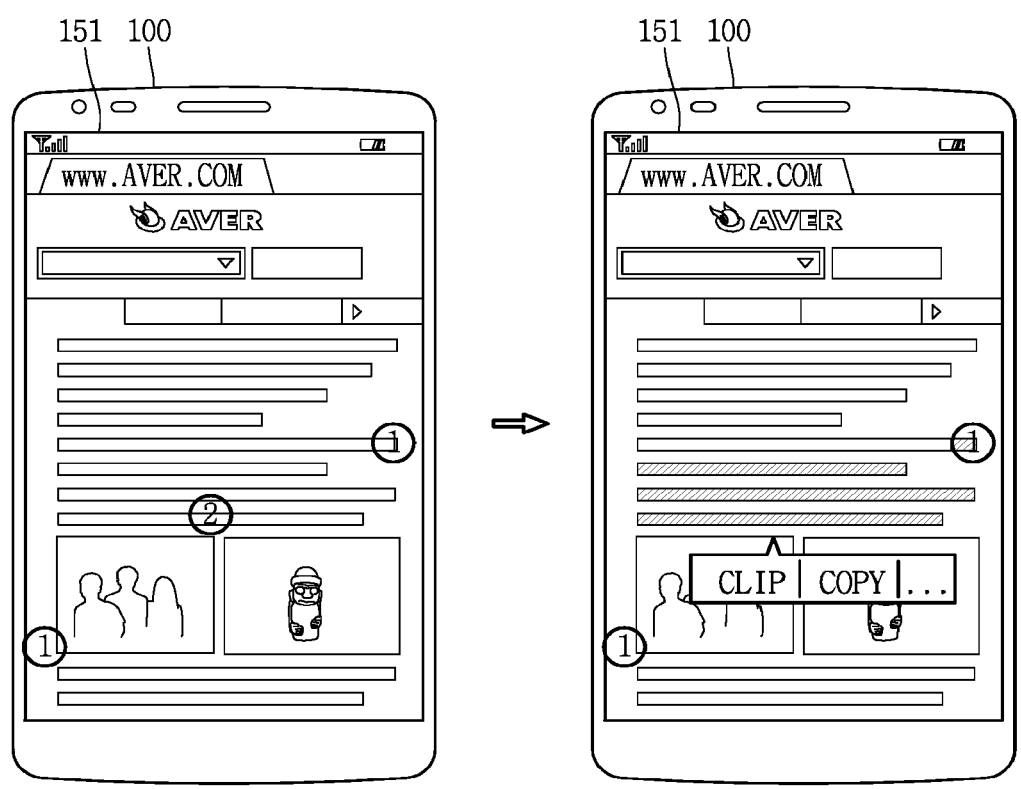
FIGS. 6A and 6B are conceptual views illustrating an embodiment to select a text displayed on a partial region by the method aforementioned in FIG. 2.
Figure 6B:
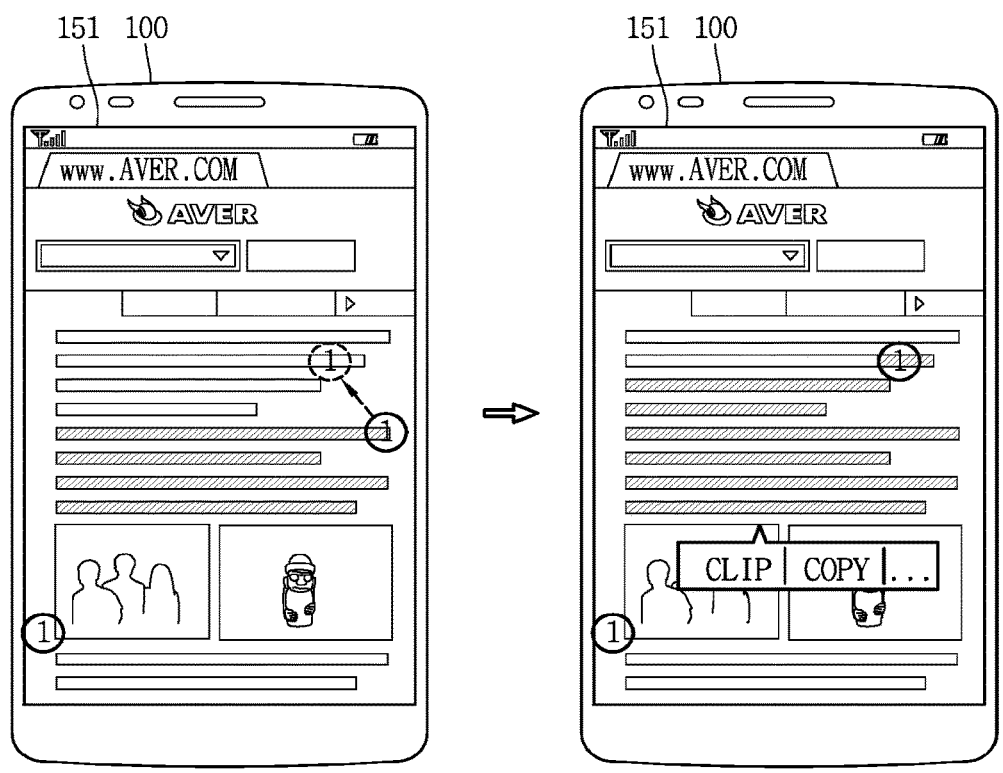

FIGS. 6A and 6B are conceptual views illustrating an embodiment to select a text displayed on a partial region by the method aforementioned in FIG. 2.

Referring to FIG. 6A, part of a text is selected by a user's gesture, in a state where an output of screen information including an image, a text, etc. is maintained.

More specifically, a touch input corresponding to a preset condition may be applied to the touch screen, in a state where the first and second touch inputs (two circles having number '1' therein) are maintained on different points. In this case, the controller sets a partial region based on the first and second touch inputs, and selects a text included in the set partial region, among an entire text displayed on the touch screen.

The controller sets a starting point using the first touch, sets an ending point using the second touch input, and sets a partial region using the starting point and the ending point. Then, the controller selects a text included in the set partial region, among an entire text displayed on the touch screen. More specifically, the controller may select a text from the left to the right, and from the upper side to the lower side, based on a position of the partial region from the starting point to the ending point.

FIG. 6A illustrates that a partial region, to which a touch input corresponding to a preset condition has been set, is touched once (refer to circle having number '2' therein). However, the present invention is not limited to this. That is, a text displayed on the touch screen may be partially selected by a long touch, a multi-touch, a double tap, etc.

Once the text is selected, the selected text may be highlighted so as to be distinguished from a non-selected text. For instance, a visual effect, such as a color change, an emphasis process and an underline process, may be provided to the selected text.

Once the text is selected, the controller may display at least one menu for executing a function related to the selected text, on one region of the touch screen. For instance, the function related to the selected text may be a copy, a clip (cut-out), etc.

After the text has been selected by the touch input corresponding to the preset condition, at least one of the first and second touch inputs may be moved. In this case, the partial region may be reset by the at least one, and the selected text may be changed. For instance, as shown in FIG. 6B, once at least one of the first and second touch inputs is moved, a starting point and/or an ending point for selecting a text are/is changed, and thus the selected text is changed.

Although not shown, if at least one of the first and second touch inputs is released after the text has been selected, the selected text maintains its selected state whereas the set partial region is released.

A user may set a starting point using the first touch input, set an ending point using the second touch input, and set a text corresponding to a region formed by the starting point and the ending point, by applying a touch input corresponding to a preset condition. A user may select a desired text simply and rapidly, because the starting point and the ending point are set at one time, and at least one of the starting point and the ending point is reset by moving at least one of the first and second touch inputs.

Figure 7A:
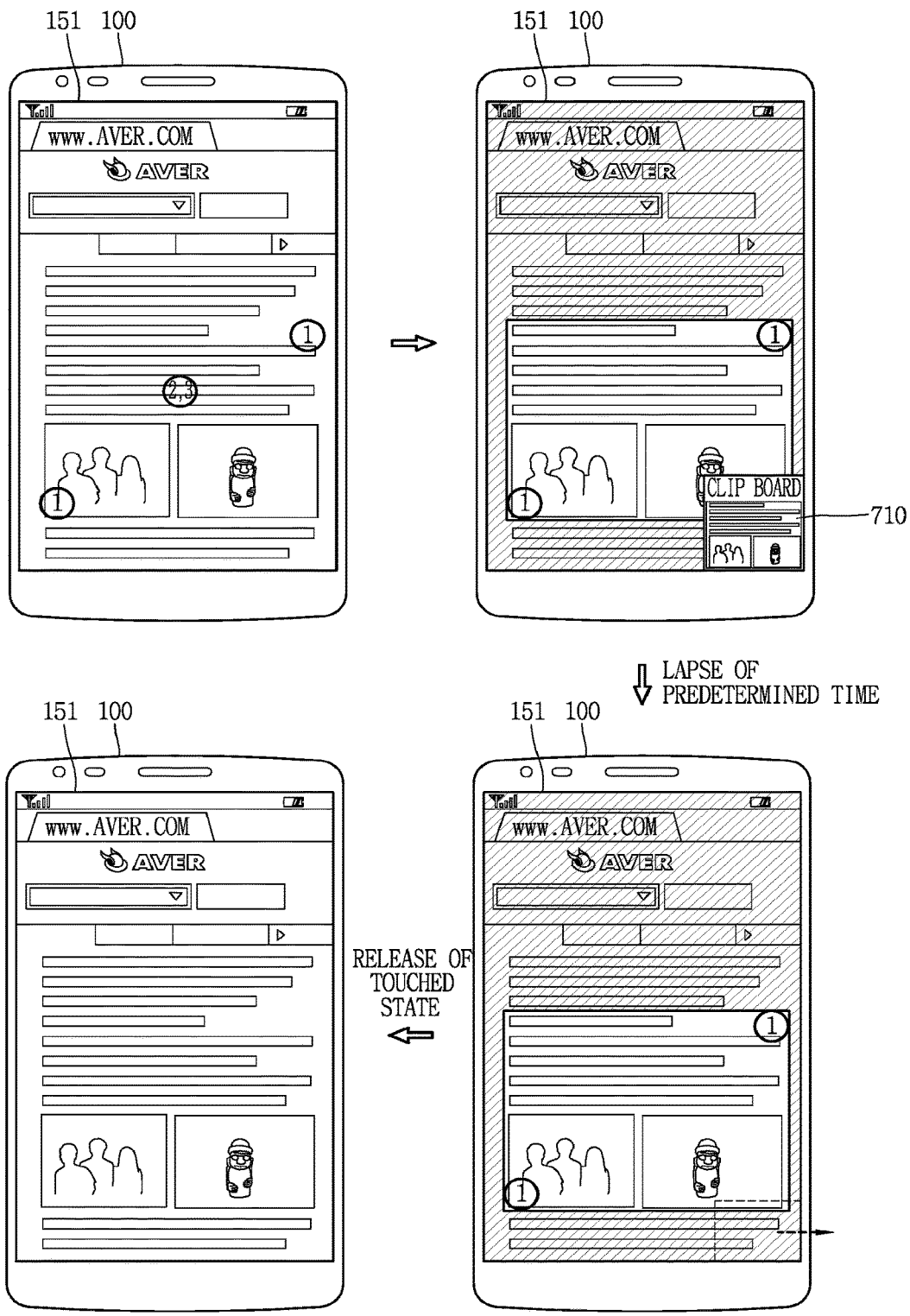
FIGS. 7A to 7C are conceptual views illustrating an embodiment to capture screen information displayed on a partial region by the method aforementioned in FIG. 2.
Figure 7B:
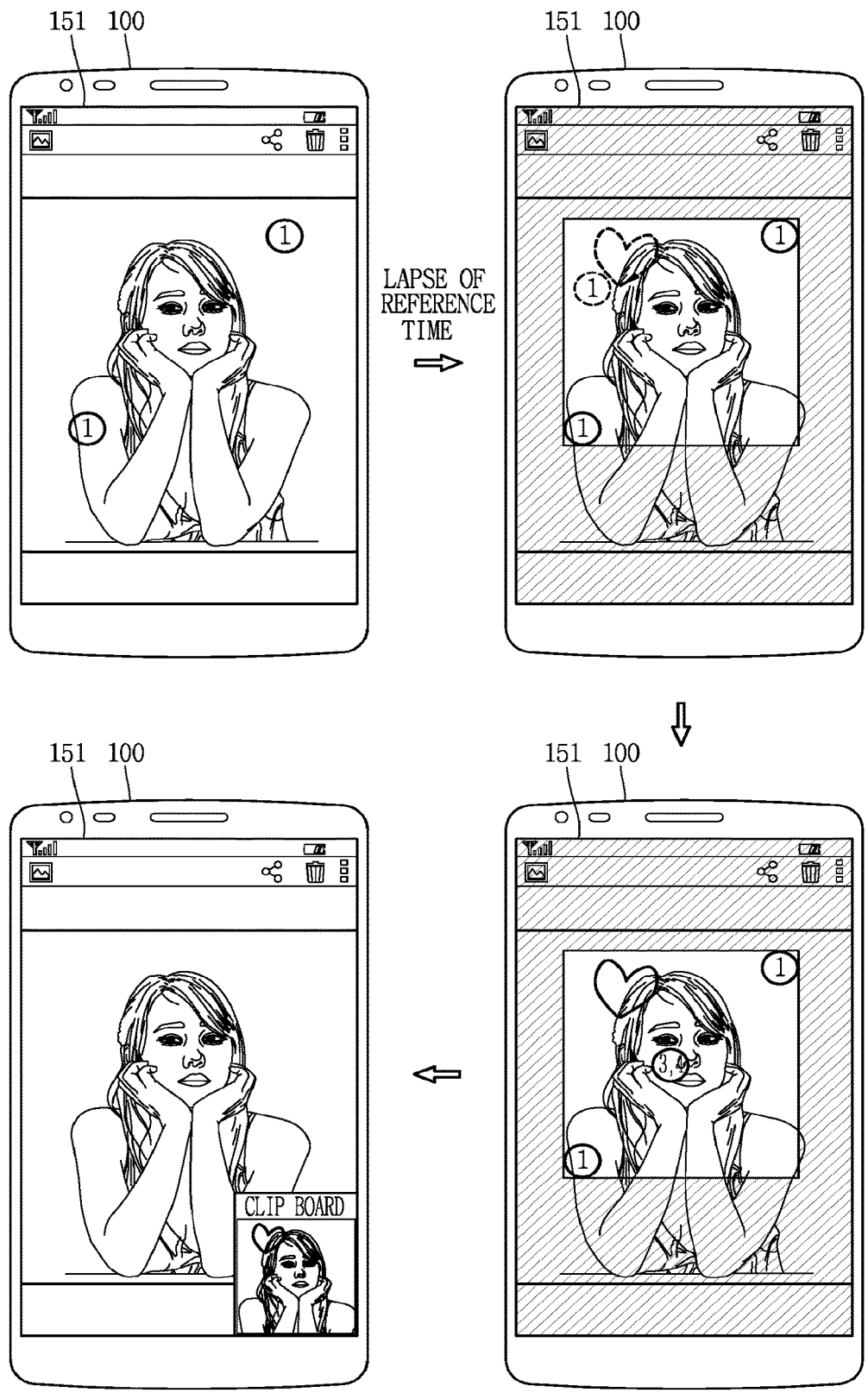
Figure 7C:
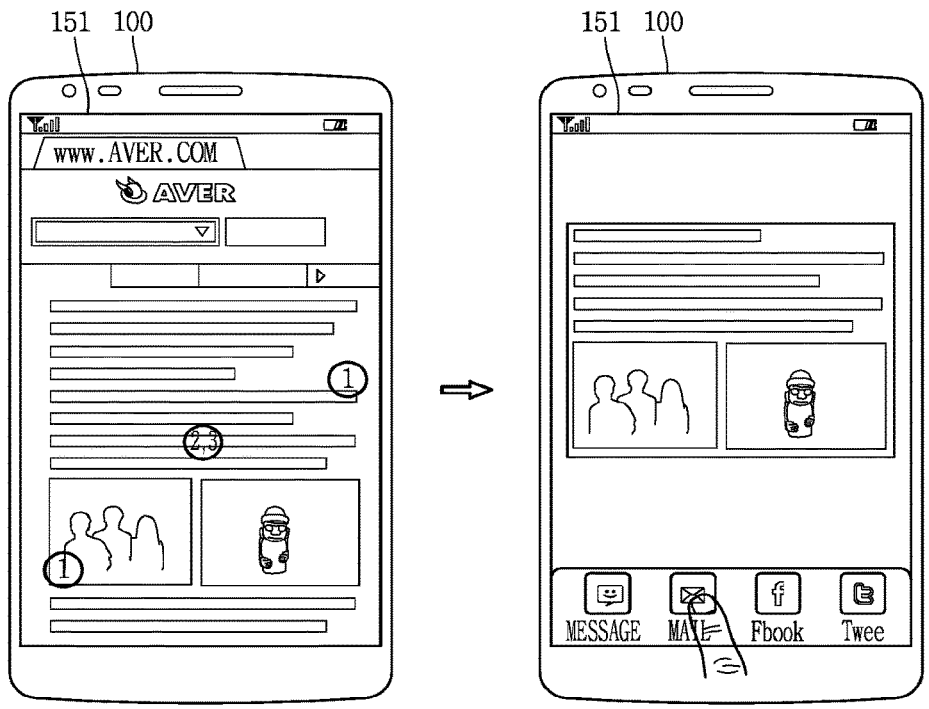
Figure 7C:
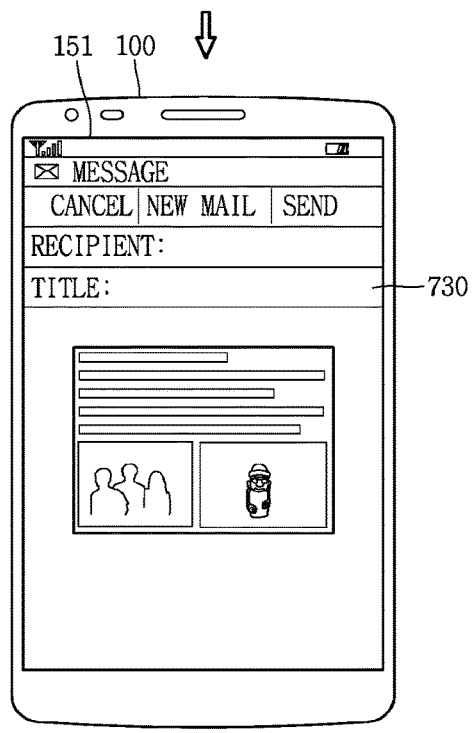

FIGS. 7A to 7C are conceptual views illustrating an embodiment to capture screen information displayed on a partial region by the method aforementioned in FIG. 2.

Referring to FIG. 7A, screen information of a partial region set by first and second touch inputs may be captured by a touch input corresponding to a preset condition.

In a state where the screen information has been displayed on the touch screen, the first and second touch inputs are received. Execution of a specific function by at least one of the first and second touch inputs is restricted. For instance, if a graphic object corresponding to a control function is displayed on a touch point of the at least one touch input, or if a link for displaying other screen information is displayed, the controller restricts execution of the control function.

If a reference time lapses while the first and second touch inputs are maintained without being released, the controller sets a partial region based on the first and second touch inputs. Then, if a touch input corresponding to a preset condition is applied, the controller generates a digital image by capturing screen information of the partial region. The generated digital image may be stored in the memory, or may be transmitted to an external server so as to be stored in the external server.

The touch input set to capture the partial region may include third and fourth touch inputs consecutively applied onto a predetermined region of the touch screen within a reference time. However, the present invention is not limited to this. That is, the partial region may be captured by a long touch, a multi-touch, a double tap, etc.

The generated digital image may be stored in a clipboard. The clipboard means a memory region used as a temporary storage space when copying or pasting data from one program to another program is executed. A user may paste information stored in the clipboard, to a desired program.

In a case where the digital image has been stored in the clipboard, as shown in FIG. 7A, the controller displays at least part of the digital image stored in the clipboard, on a region of the touch screen 151 for a predetermined time. For instance, a clipboard window 710 including the digital image may be displayed on at least one region of the touch screen. Thus, a user may visually check the captured digital image, and may input the captured digital image to another program by using the clipboard. If the predetermined time lapses, the controller terminates the display of the digital image.

Although not shown, if a touch input is applied onto the clipboard window 710, content stored in the clipboard, rather than the screen information displayed on the touch screen may be displayed.

If the first and second touch inputs are maintained even after the digital image has been generated by the touch input corresponding to the preset condition, the partial region maintains its set state. Thus, a user may execute an additional capturing function, and may change the partial region to be captured by moving at least one of the first and second touch inputs. That is, the present invention provides a novel user interface for executing a capturing function rapidly and simply.

Once at least one of the first and second touch inputs is released, the set partial region is released.

Referring to FIG. 7B, the controller may execute a memo function based on a drag input applied onto the partial region.

More specifically, upon reception of a drag input applied from a first point to a second point on the partial region, the controller may display, on the partial region, an image which is gradually changed along a path of the drag input. For instance, as shown in FIG. 7B, if a drag input which forms a path of a heart shape is applied onto the partial region, a heart-shaped line (or image) is displayed on the partial region. That is, a memo function to write a memo on the partial region may be implemented by using a drag input.

The memo generated by the drag input is continuously displayed on the partial region, even if the drag input is released. The memo is continuously displayed unless the partial region is released. That is, when at least one of the first and second touch inputs is released, the partial region is released and the memo disappears from the touch screen. That is, the controller terminates the display of the memo when the partial region is released.

If a touch input set to execute a capturing function is applied onto the touch screen after the memo is generated, the controller captures not only screen information included in the partial region, but also the memo included in the partial region. Thus, a user may generate a digital image having the memo added thereto, without driving an additional image edition application.

Although not shown, a memo is not generated when a drag input is applied to the remaining region rather than the partial region, or when the partial region has not been set. That is, the controller executes a memo function by a drag input applied to the partial region, and restricts the memo function by a drag input applied to the remaining region.

Referring to FIG. 7C, once a digital image is generated, the controller may output servers to which the digital image is to be transmitted, in the form of links. When at least one of the servers is selected, the controller may output a message writing window 730 including the digital image.

More specifically, once a digital image is generated, the controller may display the digital image rather than the existing screen information, on the touch screen 151. In this case, servers to which the digital image is to be transmitted, may be displayed on the touch screen 151 together with the digital image.

The servers mean servers to which the digital image is to be transmitted. However, the servers may include applications to be driven for transmission of the digital image. For instance, as shown in FIG. 7C, the server may include a message application, a mail application, or an application related to a social network service (SNS).

Once at least one of the servers is selected, the controller outputs a message writing window including the digital image. The message writing window is related to at least one server selected by a user, and a message generated on the message writing window includes the digital image. For instance, as shown in FIG. 7C, once a mail application is selected, the message writing window 730 for the mail application is displayed. The message writing window 730 may include a region for inputting a recipient's address of an electronic mail, a region for inputting a title of an electronic mail, and a region for inputting content of an electronic mail. The digital image may be displayed on the region for inputting content of an electronic mail.

With such a configuration, a user may capture part of screen information in a simple manner, and may transmit the captured screen information to the outside, without applying a plurality of control commands.

Figure 8A:
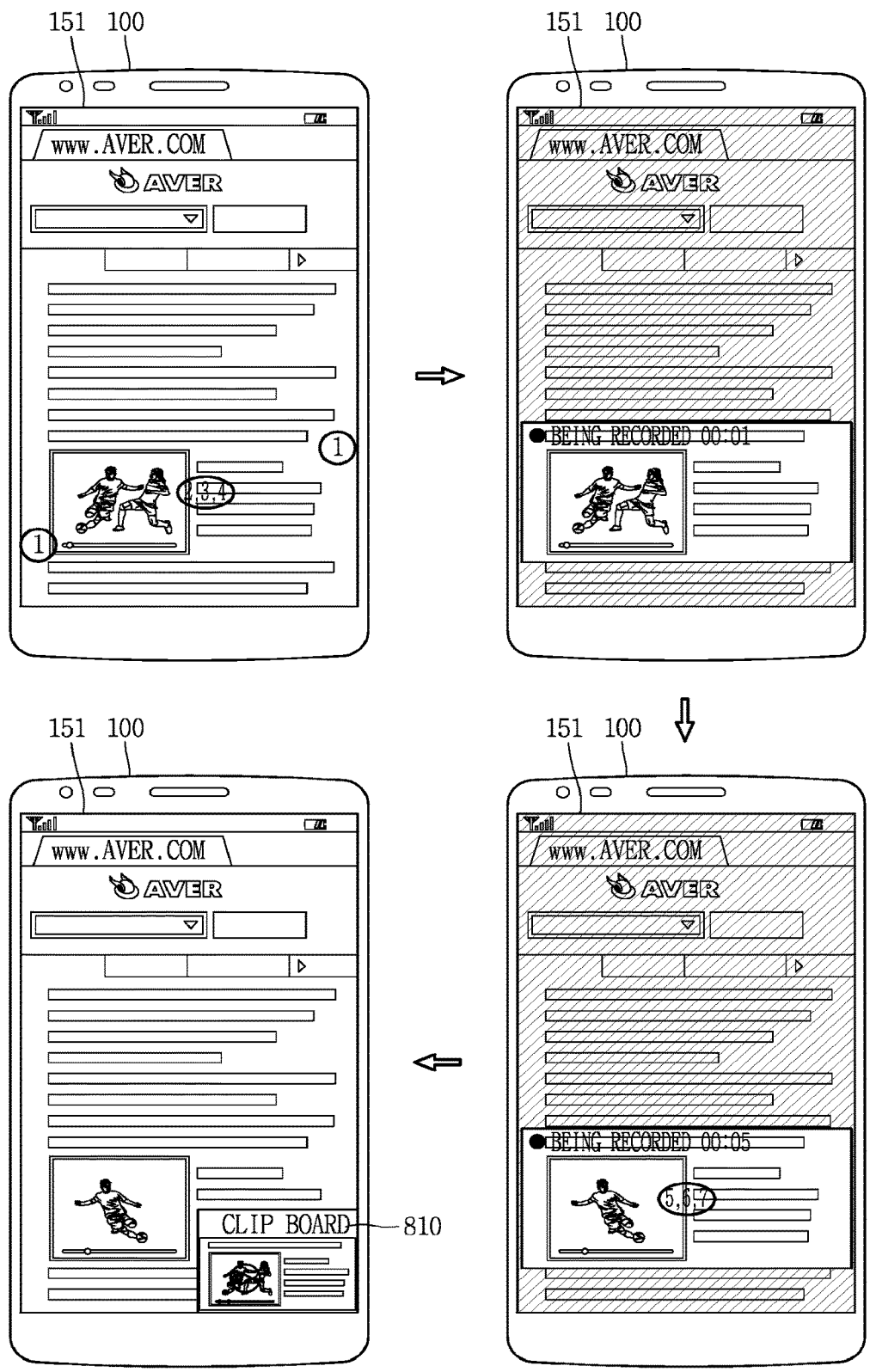
FIGS. 8A to 8C are conceptual views illustrating an embodiment to record (videotape) screen information displayed on a partial region by the method aforementioned in FIG. 2.
Figure 8B:
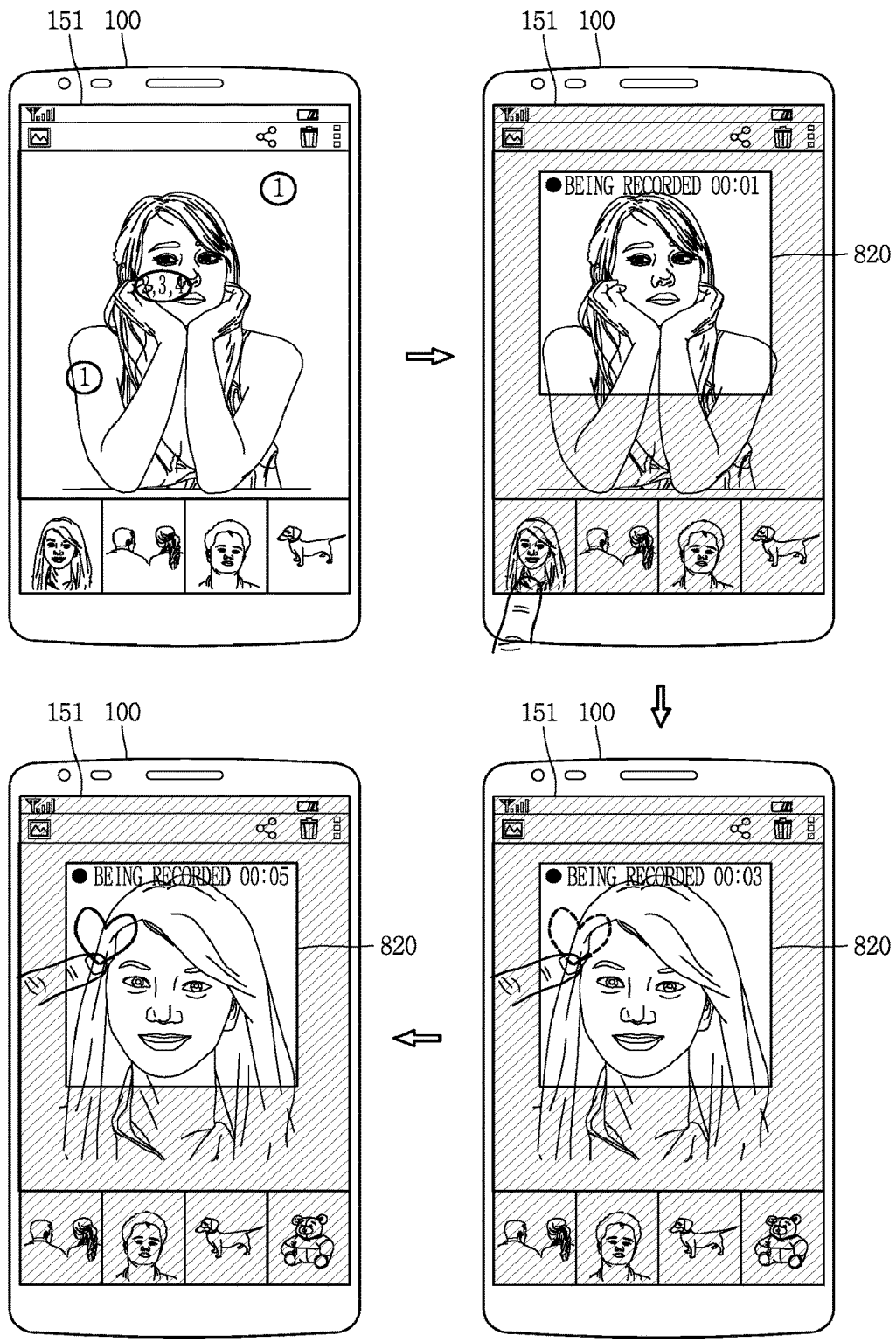
Figure 8C:
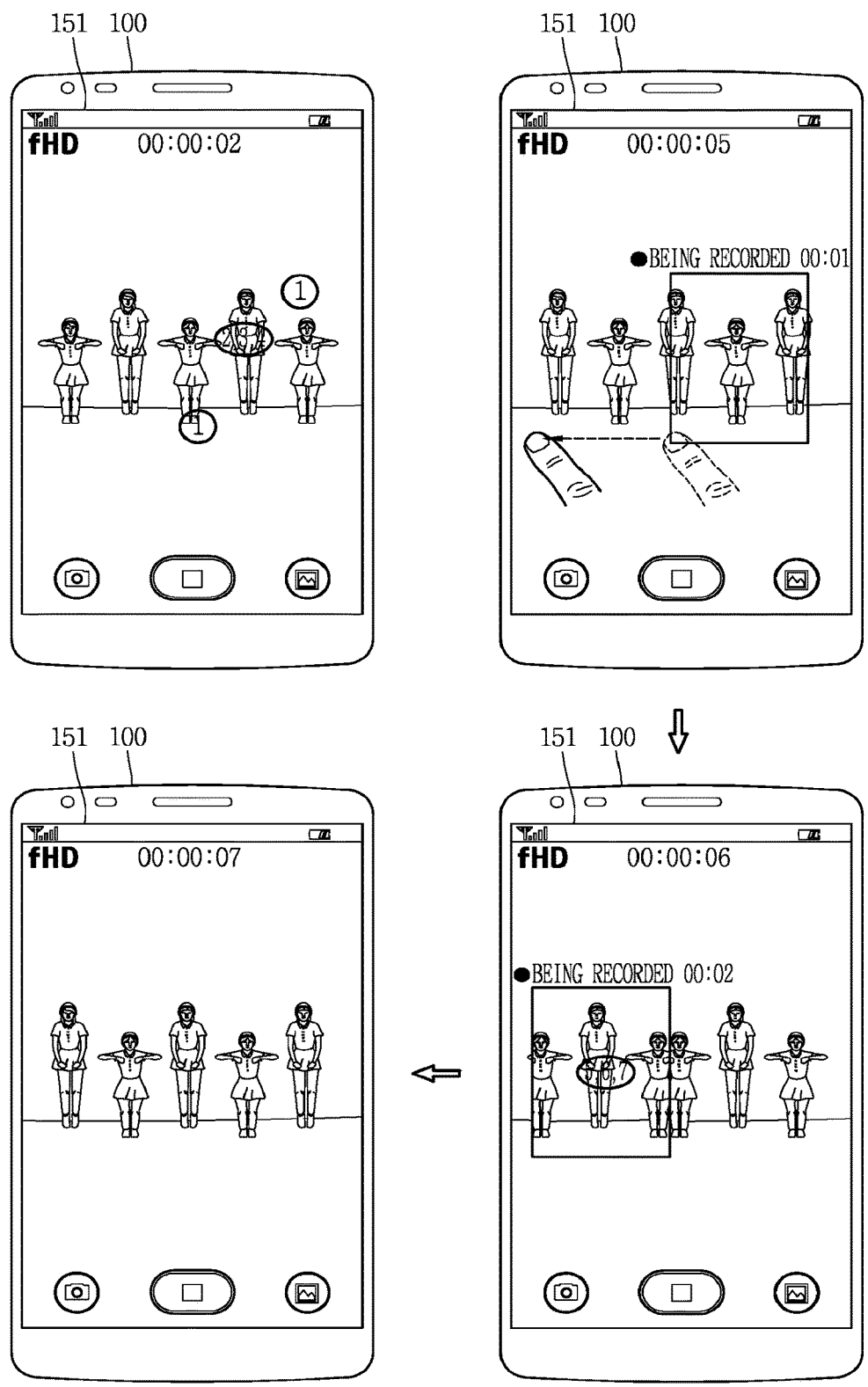

FIGS. 8A to 8C are conceptual views illustrating an embodiment to record (videotape) screen information displayed on a partial region by the method aforementioned in FIG. 2.

Referring to FIG. 8A, screen information of a partial region set by first and second touch inputs may be recorded by a touch input corresponding to a preset condition.

In a state where screen information has been displayed on the touch screen, a plurality of touch inputs are received on different points. If a reference time lapses while the plurality of touch inputs are maintained without being released, a partial region is set. For instance, if a reference time lapses while the plurality of touch inputs are maintained without being released, the controller sets a partial region based on the first and second touch inputs.

If a touch input corresponding to a preset condition is applied to the touch screen while the plurality of touch inputs are maintained without being released, the controller executes a function corresponding to the preset condition with respect to the partial region. For instance, if a touch input corresponding to a recording-related condition is applied to the touch screen, the controller records the screen information of the partial region for a predetermined time, thereby generating a digital moving image. The generated digital moving image may be stored in the memory and/or the clipboard, or may be transmitted to an external server so as to be stored in the external server.

The touch input set to record (videotape) the partial region may include third to fifth touch inputs consecutively applied onto a predetermined region of the touch screen within a reference time. However, the present invention is not limited to this. That is, the partial region may be recorded by a long touch, a multi-touch, a double tap, etc.

The partial region is continuously recorded even when at least one of the first and second touch inputs for setting the partial region is released. That is, even if at least one of the first and second touch inputs is released while the partial region is being recorded, the controller continuously executes the recording process with respect to the partial region.

A recording process means a process for continuously recording change of the screen information displayed on the touch screen, according to lapse of time. That is, as the screen information displayed on the partial region is consecutively recorded according to lapse of time, it is stored as a digital image.

The recording process may be terminated when a preset time lapses, or may be terminated when a touch input corresponding to a preset condition is applied onto the touch screen. For instance, as shown in FIG. 8A, during the recording process, if a touch input set to terminate the recording process is applied to the touch screen 151, the controller may terminate the recording process, and may store a digital moving image generated by the recording process in the memory. In a case where the digital moving image is stored in the clipboard, a clipboard window 810 including a thumbnail image of the digital moving image may be displayed on at least one region of the touch screen.

While the recording process is being executed, the partial region set by the first and second touch inputs among the entire region of the touch screen, may be differentiated from the remaining region. And a different control may be executed according to whether a touch has been applied to the partial region or the remaining region of the touch screen, during the recording process. More specifically, if a touch input is applied to the remaining region, a function related to a touch point is executed. On the other hand, if a touch input is applied to the partial region, the aforementioned menu function is executed.

As shown in FIG. 8B, in a state where first screen information has been displayed on the touch screen, a recording process with respect to a partial region 820 may be started.

If a touch input is applied to the remaining region rather than the partial region 820 while the partial region 820 is being recorded, the controller executes a function related to a touch point where the touch input has been applied. For instance, if a graphic object is displayed on the touch point, the controller may execute a function corresponding to the graphic object. On the other hand, if a link is displayed on the touch point, the controller may execute a function to move to screen information corresponding to the link.

Second screen information rather than the first screen information may be displayed on the touch screen by the touch input applied to the remaining region. For instance as shown in FIG. 8B, some of a plurality of images stored in the memory may be displayed on the touch screen, and one image may be replaced by another image by the touch input applied to the remaining region.

Even if the screen information is changed by the touch input applied to the remaining region, the partial region is maintained as it is, and the screen information displayed on the partial region is recorded. That is, change of the screen information displayed on the partial region, to the second screen information from the first screen information is recorded. As shown in FIG. 8B, the first screen information is partially recorded at a section of 0~3 seconds, and the second screen information is partially recorded at a section after 3 seconds. That is, a user may change a type or content of the screen information displayed on the partial region, by applying a touch input to the remaining region.

If a touch is applied to the partial region 820 while the partial region 820 is being recorded, the controller determines whether the touch input is a touch input corresponding to a preset condition, a drag input, or other type of touch input.

If the touch input is a touch input corresponding to a preset condition, the controller terminates the recording process.

On the contrary, if the touch input applied to the partial region 820 is a drag input, the controller executes the aforementioned menu function. More specifically, if a drag input applied to a second point from a first point on the partial region is received while the recording process is being executed, the controller may display an image which is gradually changed along a path of the drag input, on the partial region. For instance, as shown in FIG. 8B, if a drag input which forms a heart-shaped path is applied to the partial region 820, a heart-shaped line (or image) is displayed on the partial region. That is, a memo function for writing a memo on the partial region may be implemented by a drag input.

A memo (or image) generated by the drag input is recorded together with screen information displayed on the partial region. More specifically, the controller records a memo which is gradually changed along a path of the drag input, together with screen information. For instance, as shown in FIG. 8B, a heart-shaped memo may be displayed at a section of 3~5 seconds, among an entire section of a digital moving image.

As aforementioned, the mobile terminal of the present invention provides a novel user interface for simply executing a recording process with respect to a partial region among an entire region of the touch screen. Further, since a recorded digital moving image may include a memo generated by a user's input, the user may record his or her feeling or emotion about screen information being recorded, in the digital moving image.

A memo function may be executed differently according to whether screen information displayed on the partial region is being recorded or not.

Generally, the memo function is executed by a drag input applied to a partial region in a state where a plurality of touch inputs for setting the partial region are maintained without being released. An image corresponding to a path of the drag input is displayed on the touch screen. If the drag input is released, the controller executes a different operation according to whether a recording process with respect to the screen information displayed on the partial region is being executed or not.

For instance, in a case where a recording process is not being executed, the controller continuously displays an image corresponding to a path of the drag input, even if the drag input has been released. If the partial region is not released, a plurality of different images may be generated in an overlapped manner, by a plurality of drag inputs applied at different time points. Then, the plurality of different images are included in a digital image by a capturing command applied later.

On the contrary, if a drag input is applied to the partial region during a recording process, and then if the drag input is released, the controller displays an image corresponding to a path of the drag input for a predetermined time. After the predetermined time lapses, the controller terminates the display of the image.

The predetermined time may be a very short time, e.g., 0.5 seconds. Once the drag input is released, the controller may immediately terminate the display of the image. The predetermined time may be differently set by a user. Although not shown, the mobile terminal may provide a user interface for setting the predetermined time.

In a case where a recording process is being executed, change of screen information due to a time lapse is recorded, in order to prevent a memo generated at a specific time point from being continuously recorded.

The partial region may be captured or recorded while a moving image is being captured.

More specifically, as shown in FIG. 8C, the controller may activate the camera provided at the body, and may display a preview image captured by the camera on the touch screen. The controller may execute a capturing process in response to a capturing command with respect to the preview image, and may generate a digital moving image. When a moving image is captured, a preview image, a graphic object corresponding to a moving image capturing function, and information on a time lapse in capturing may be displayed on the touch screen.

If a plurality of touch inputs are received on different points of the touch screen while a capturing process is executed (or while a preview image is being displayed), and then if the plurality of touch inputs are maintained for a reference time without being released, the controller sets a partial region based on the plurality of touch inputs. Then, the controller may execute a different function related to the partial region, according to whether an applied touch input corresponds to which condition among a plurality of preset conditions. For instance, the controller may generate a digital image by capturing screen information included in the partial region, or may generate a digital moving image by recording the screen information.

If a capturing process with respect to screen information displayed on the partial region is executed during the capturing process, a digital image including the screen information of the partial region is generated in a separated manner from a digital moving image generated by the capturing process.

If a recording process with respect to the screen information displayed on the partial region is executed during the capturing process, two different digital moving images are generated. For instance, a first digital moving image is generated in correspondence to an entire region of the touch screen, and a second digital moving image is generated in correspondence to a partial region of the touch screen.

If a recording process is executed during the capturing process, information on the capturing process and information on the recording process are displayed on the touch screen. The information on the recording process includes information on a partial region where the recording process is executed, a time lapse in recording, and a memo generated by a drag input applied to the partial region. The information on the capturing process is displayed on the touch screen, whereas the information on the capturing process is not included in the first and second digital moving images.

If the partial region is being recorded, the controller may display a boundary line for distinguishing the partial region and the remaining region from each other. As shown in FIG. 8C, the controller may display a partial region display window 830 rather than the boundary line.

The controller may change at least one of a size and a position of the partial region, based on a touch applied to the partial region display window 830. For instance, if a touch starting from an edge of the partial region display window 830 is consecutively moved to another point and then the touch input is released, the controller may change a position of the partial region display window 830. As the position of the partial region display window 830 is changed, the partial region to be recorded is reset. A size of the partial region display window 830 may be changed by the method aforementioned in FIG. 5.

In a case where the capturing process and the recording process are simultaneously executed, the capturing process and the recording process may be terminated individually by a user's input. For instance, if a touch input set to terminate a recording process is applied to the partial region, the controller may terminate the recording process, and may store a recorded digital moving image in the memory. As the recording process is terminated, information on the recording process disappears from the touch screen whereas the capturing process is continuously executed. As another example, if a touch is applied to a graphic object 820 corresponding to termination of the capturing process, the controller may terminate the capturing process and may store a captured digital moving image in the memory. As the capturing process is terminated, information on the capturing process disappears from the touch screen. However, in this case, the recording process is continuously executed.

Thus, the mobile terminal of the present invention may simultaneously generate a captured digital moving image including an entire region of an image captured by the camera, and a recorded digital moving image including a partial region of the image. That is, the mobile terminal may store an entire region of a scene captured by the camera by using a capturing function, and may store a partial region of the scene as a separate file by using a recording function.

Figure 9:
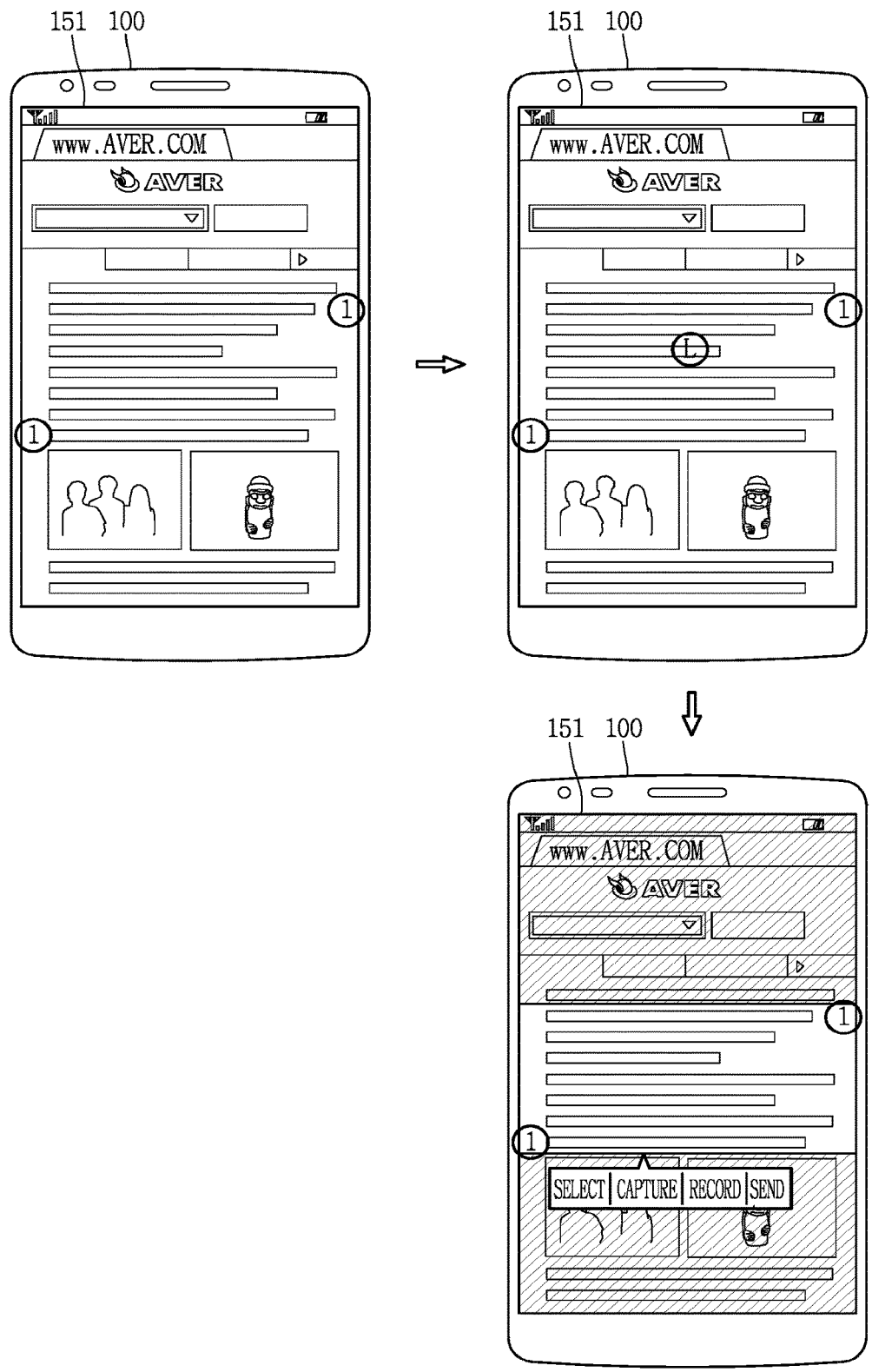
FIG. 9 is a conceptual views illustrating an embodiment to display graphic objects related to a partial region by the method aforementioned in FIG. 2.

FIG. 9 is a conceptual views illustrating an embodiment to display graphic objects related to a partial region by the method aforementioned in FIG. 2.

More specifically, if a reference time lapses in a state where a plurality of touch inputs applied to different points are maintained without being released, the controller sets a partial region. The controller may highlight the partial region such that the partial region and the remaining region are distinguished from each other. Thus, a user may recognize that the partial region has been set, and may distinguish the partial region from the remaining region.

Once the partial region is set, the controller may display a plurality of graphic objects corresponding to different functions related to the partial region, on one region of the touch screen.

More specifically, the controller may display the plurality of graphic objects on one region of the touch screen, if a touch input corresponding to a preset condition is applied to the touch screen in a state where a plurality of touch inputs received on different points are maintained without being released. Thus, the graphic objects are prevented from being displayed unintentionally.

The touch input set to display the plurality of graphic objects corresponding to preset conditions may be a long touch (a circular diagram including an English letter 'L') as shown in FIG. 9. However, the touch input is not limited to the long touch, but may be modified to various types of touch inputs.

The different functions related to the partial region may include various functions aforementioned with reference to FIGS. 6A to 8C. For instance, the different functions may include a function to select a text included in the partial region, a function to capture screen information included in the partial region, a function to record the screen information included in the partial region, and a function to capture the screen information and to display a message transmission window including a captured digital image.

The graphic objects disappear from the touch screen when at least one of a plurality of touch inputs for setting the partial region is released. That is, the controller terminates the display of the graphic objects when at least one of a plurality of touch inputs for setting the partial region is released.

In a state where the graphic objects have been displayed, if a touch is applied to one of the graphic objects, the controller may execute a function corresponding to the one, and may display an execution screen on the touch screen.

Thus, a user may selectively execute a specific function related to the partial region by using the graphic objects, without remembering a touch input set to execute the specific function.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a camera;
   a touch screen;
   at least one processor; and
   at least one memory that is operably connectable to the at least one processor and that has stored thereon instructions which, when executed, cause the at least one processor to perform operations comprising:
   displaying, on the touch screen, a preview moving image obtained by the camera;
   detecting a first storage command while the preview moving image is displayed on the touch screen;
   displaying, on the touch screen and in response to the first storage command, a first moving image obtained by the camera, wherein the first moving image is stored in the at least one memory;
   detecting a first touch input on the touch screen while the first moving image is displayed on the touch screen;
   selecting, in response to the first touch input, a partial region of the touch screen while the first moving image is displayed on the touch screen;
   displaying, on the touch screen, a portion of the first moving image in the partial region while the first moving image is displayed on the touch screen;
   detecting a second storage command while the portion of the first moving image is displayed in the partial region and while the first moving image is displayed on the touch screen; and
   displaying, on the touch screen and in response to a second storage command, a second moving image in the partial region while the first moving image is displayed on the touch screen, wherein the second moving image is stored in the at least one memory.

2. The mobile terminal of claim 1, wherein the operations further comprise:
   executing, in response to the first storage command, a first storage operation on the preview moving image displayed on the touch screen to store the preview moving image as the first moving image.

3. The mobile terminal of claim 2, wherein the first touch input is detected on the touch screen while the first storage operation is executed on the preview moving image displayed on the touch screen.

4. The mobile terminal of claim 2, wherein the operations further comprise:
   displaying, on the touch screen while the first storage operation is executed on the preview moving image displayed on the touch screen, a first time duration related to a progress of the first storage operation.

5. The mobile terminal of claim 2, wherein the operations further comprise:
   executing, in response to the second storage command, a second storage operation on the portion of the first moving image displayed in the partial region to store the portion of the first moving image as the second moving image.

6. The mobile terminal of claim 5, wherein the operations further comprise:
   displaying, on the touch screen, a second time duration related to a progress of the second storage operation while the second storage operation and the first storage operation are executed.

7. The mobile terminal of claim 6, wherein the operations further comprise:
   detecting a second touch input; and
   in response to the second touch input, terminating at least one of the first storage operation or the second storage operation.

8. The mobile terminal of claim 1, wherein the first moving image is stored in a first file in the at least one memory, and
   wherein the second moving image is stored in a second file, different from the first file, in the at least one memory.

9. The mobile terminal of claim 1, wherein the partial region of the touch screen is displayed by displaying at least one boundary line distinguishing the partial region from a remaining region of the touch screen.

10. The mobile terminal of claim 9, wherein the operations further comprise:

changing at least one of a size or a position of the partial region, based on a third touch input applied to the at least one boundary line.

11. A method of controlling a mobile terminal, the method comprising:
- displaying, on a touch screen of the mobile terminal, a preview moving image obtained by a camera of the mobile terminal;
- detecting a first storage command while the preview moving image is displayed on the touch screen;
- displaying, on the touch screen and in response to the first storage command, a first moving image obtained by the camera, wherein the first moving image is stored in at least one memory of the mobile terminal;
- detecting a first touch input on the touch screen while the first moving image is displayed on the touch screen;
- selecting, in response to the first touch input, a partial region of the touch screen while the first moving image is displayed on the touch screen;
- displaying, on the touch screen, a portion of the first moving image in the partial region while the first moving image is displayed on the touch screen;
- detecting a second storage command while the portion of the first moving image is displayed in the partial region and while the first moving image is displayed on the touch screen; and
- displaying, on the touch screen and in response to a second storage command, a second moving image in the partial region while the first moving image is displayed on the touch screen, wherein the second moving image is stored in the at least one memory.

12. The method of claim 11, further comprising:
executing, in response to the first storage command, a first storage operation on the preview moving image displayed on the touch screen to store the preview moving image as the first moving image.

13. The method of claim 12, wherein the first touch input is detected on the touch screen while the first storage operation is executed on the preview moving image displayed on the touch screen.

14. The method of claim 12, further comprising:
displaying, on the touch screen while the first storage operation is executed on the preview moving image displayed on the touch screen, a first time duration related to a progress of the first storage operation.

15. The method of claim 12, further comprising:
executing, in response to the second storage command, a second storage operation on the portion of the first moving image displayed in the partial region to store the portion of the first moving image as the second moving image.

16. The method of claim 15, further comprising:
displaying, on the touch screen, a second time duration related to a progress of the second storage operation while the second storage operation and the first storage operation are executed.

17. The method of claim 16, further comprising:
detecting a second touch input; and
in response to the second touch input, terminating at least one of the first storage operation or the second storage operation.

18. The method of claim 11, wherein the first moving image is stored in a first file in the at least one memory, and
wherein the second moving image is stored in a second file, different from the first file, in the at least one memory.

19. The method of claim 11, wherein the partial region of the touch screen is displayed by displaying at least one boundary line distinguishing the partial region from a remaining region of the touch screen.

20. The method of claim 19, further comprising:
changing at least one of a size or a position of the partial region, based on a third touch input applied to the at least one boundary line.

* * * * *